United States Patent
Hall et al.

(10) Patent No.: US 8,015,879 B2
(45) Date of Patent: Sep. 13, 2011

(54) ORIENTATION AWARE SENSOR

(75) Inventors: Richard Hall, Minden, NV (US); Marc Tompkins, Minden, NV (US)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 11/896,156

(22) Filed: Aug. 30, 2007

(65) Prior Publication Data
US 2009/0056456 A1    Mar. 5, 2009

(51) Int. Cl.
*G01H 11/00* (2006.01)
(52) U.S. Cl. ............... 73/660; 73/661; 73/1.82
(58) Field of Classification Search ............ 73/660, 73/618–620, 661
See application file for complete search history.

(56) References Cited

U.S. PATENT DOCUMENTS

| | | | | |
|---|---|---|---|---|
| 4,229,796 A * | 10/1980 | Garrett | ............ | 73/622 |
| 4,518,917 A * | 5/1985 | Oates et al. | ............ | 73/660 |
| 5,686,669 A * | 11/1997 | Hernandez et al. | ............ | 73/660 |
| 5,833,608 A * | 11/1998 | Acker | ............ | 600/409 |
| 6,011,585 A * | 1/2000 | Anderson | ............ | 348/272 |
| 6,768,949 B2 * | 7/2004 | Shupe et al. | ............ | 73/660 |
| 7,075,296 B2 * | 7/2006 | Moore | ............ | 73/660 |
| 7,394,257 B2 * | 7/2008 | Martinez et al. | ............ | 324/356 |
| 2005/0199832 A1 * | 9/2005 | Twerdochlib | ............ | 250/559.29 |
| 2006/0055396 A1 * | 3/2006 | Georgeson et al. | ............ | 324/202 |
| 2007/0062292 A1 * | 3/2007 | Sato et al. | ............ | 73/649 |
| 2007/0119255 A1 * | 5/2007 | Czerw et al. | ............ | 73/660 |
| 2008/0054741 A1 * | 3/2008 | Oyama | ............ | 310/68 A |
| 2008/0056906 A1 * | 3/2008 | Gray et al. | ............ | 416/244 R |

OTHER PUBLICATIONS

Signal Quest, [online] retrieved on Aug. 29, 2007; retrieved from the Internet at http://www.signalquest.com/product_selection.htm.

* cited by examiner

*Primary Examiner* — Hezron E Williams
*Assistant Examiner* — Nashmiya Fayyaz
(74) *Attorney, Agent, or Firm* — Cantor Colburn LLP

(57) ABSTRACT

A sensor for detecting a parameter of an object includes a probe, a first sensing member for detecting the parameter of an object to be sensed and a second sensing member for determining an orientation of the probe relative to the object to be sensed. The second sensing member communicates the orientation of the probe to a data acquisition device to minimize data analysis errors associated with inaccurate orientation information.

20 Claims, 2 Drawing Sheets

ORIENTATION AWARE SENSOR

BACKGROUND OF THE INVENTION

The present invention pertains to the art of vibration sensors and, more particularly, to a sensor that not only senses vibration of an object but also determines a particular orientation of the sensor relative to the object.

Certainly, vibration sensors are known in the art. Vibration sensors are used in various industries to monitor vibration in objects. Collected vibration data is utilized to determine operating conditions of the object being sensed. For example, vibration data is collected to determine whether a rotating object is out-of-balance. Vibration data is also collected to determine whether a reciprocating object is not moving smoothly or whether a stationary object is being exposed to vibrations that may affect a particular operation or process. In any case, vibration sensors are mounted at a particular orientation relative to the object of interest.

In order to accurately analyze any collected data, data analysis systems should be programmed with the particular orientation of each sensor. Towards that end, the orientation of each sensor is determined and entered into a configuration portion of the data analysis system. Generally, sensors are mounted horizontally, vertically or 45° off a vertical axis. Once the orientation of a sensor(s) is known, vibration data is collected and properly analyzed.

Over time, the object being sensed will likely require maintenance. Many maintenance procedures require disassembly of the object being sensed and removal of any associated sensors. Once maintenance is complete, the object being sensed is reassembled and the sensors re-mounted. During reassembly, the sensor(s) can be accidentally mounted in reverse, or at a new orientation. If the orientation information pertaining to each sensor is not properly checked, and any new orientation information properly updated in the vibration monitoring system, the accuracy of any data obtained from that sensor(s) may be compromised.

BRIEF DESCRIPTION OF THE INVENTION

In accordance with one aspect, the present invention provides a sensor system for detecting a parameter of an object and an orientation of the sensor. More specifically, the sensor includes a probe that has a first sensing member for detecting a parameter of an object to be sensed. The sensor also includes a second sensing member for determining an orientation of the probe relative to the object to be sensed. The second sensing member enables accurate tracking of the orientation of the probe relative to the object to be sensed in order to minimize data analysis errors which could result from inaccurate orientation data.

In accordance with another aspect, a method of sensing orientation of a sensor that monitors a parameter of an object is provided. The method includes mounting a probe relative to an object to be sensed and sensing, through at least one sensing member, a parameter of the object. The method further requires detecting an orientation of the probe relative to the object being sensed with another sensing member and communicating the orientation of the probe to a data acquisition device.

In accordance with yet another aspect of the present invention, a turbomachine is provided. The turbomachine includes a rotating member and a sensor including a probe mounted relative to the rotating member. The sensor includes a first sensing member for detecting a parameter of the rotating member and a second sensing member for determining an orientation of the probe relative to the turbomachine.

At this point it should be appreciated that the present invention provides a system for monitoring an orientation of a sensor and updating a data acquisition device with sensor orientation. In this manner, any data collected from the sensor relating to a parameter of an object is not subject to analysis errors generated from out of date or incorrect sensor orientation data. Additional objects, features and advantages of the present invention will become more readily apparent from the following detailed description when taken in conjunction with the drawings wherein like reference numeral refer to corresponding parts in the several views.

DETAILED DESCRIPTION OF THE INVENTION

Figure 1:
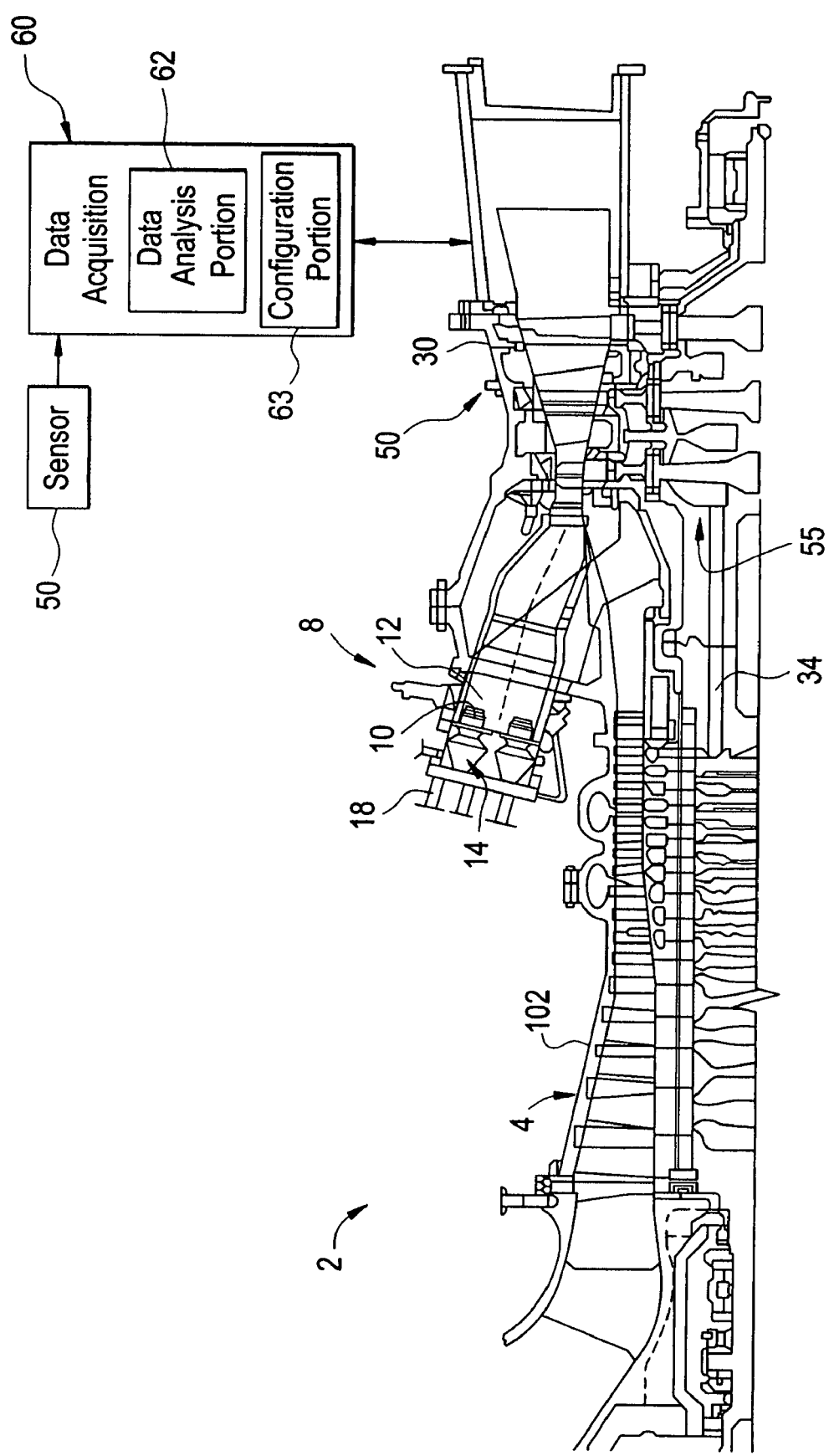
FIG. 1 is a cross sectional side view of an exemplary gas turbine fitted with an orientation aware sensor constructed in accordance with an aspect of the present invention.

FIG. 1 is a schematic illustration of an exemplary turbomachine, such as a gas turbine 2. Turbine 2 includes a compressor 4 and a combustor assembly 8. Combustor assembly 8 includes a combustor assembly wall 10 that at least partially defines a combustion chamber 12. A nozzle 14 extends through combustor assembly wall 10 and leads into combustion chamber 12. As will be discussed more fully below, nozzle 14 receives fuel through a fuel inlet 18 and compressed air from compressor 4. The fuel and compressed air are mixed, passed into combustion chamber 12 and ignited to form a high temperature, high pressure combustion product or gas stream. Although only a single combustor assembly 8 is shown, turbine 2 may include a plurality of combustor assemblies 8. In any event, turbine 2 also includes a turbine 30 and a compressor/turbine shaft 34 (sometimes referred to as a rotor). In a manner known in the art, turbine 30 is coupled to, and drives, shaft 34 that, in turn, drives compressor 4.

In operation, air flows into compressor 4 and is compressed into a high pressure gas. The high pressure gas is supplied to combustor assembly 8 and mixed with fuel, for example process gas and/or synthetic gas (syngas). This fuel/air or combustible mixture is passed into combustion chamber 12 and ignited to form a high pressure, high temperature combustion gas stream of approximately 871° Celsius (C.) to 1593° C. (1600° Fahrenheit (F.) to 2900° F.). Alternatively, combustor assembly 8 can combust fuels that include, but are not limited to natural gas and/or fuel oil. In any event, combustor assembly 8 channels the combustion gas stream to turbine 30 which coverts thermal energy to mechanical, rotational energy.

During operation, various operating parameters of turbine 2 are monitored by a plurality of sensors, one of which is indicated at 50. In accordance with the embodiment shown, sensor 50 is positioned on an outside casing (not separately labeled) of turbine 2 to measure vibrations of shaft 34 in order to monitor the condition of associated bearings, one of which is indicated generally at 55. However, it should be understood that multiple sensors (not shown), typically mounted in pairs, are provided at each bearing of turbine 2. In this manner, any wear on turbine bearings, such as bearings 55, that is outside normal operating parameters is detected thereby providing service personnel an opportunity to correct any problems before a failure can occur. That is, data received from sensor 50 is passed to a data acquisition and analysis device 60. Data acquisition and analysis device 60 includes a data analysis portion 62 that analyzes data received from sensor 50. In order to properly analyze data from sensor 50, data acquisition device 60 also includes a configuration portion 63 which receives sensor configuration data from sensor 50 as will be discussed more fully below.

Figure 2:
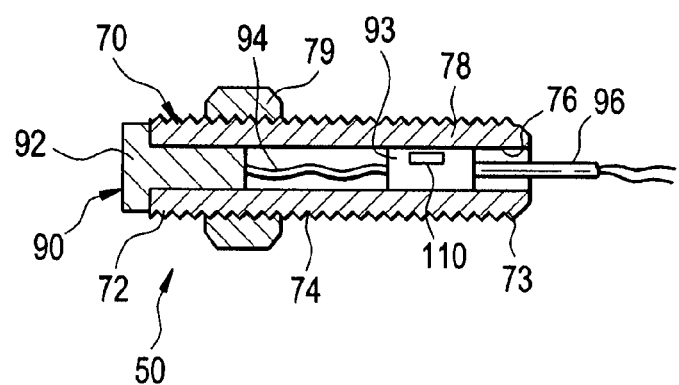
FIG. 2 is a partial cross-sectional view of the orientation aware sensor of FIG. 1.

As best shown in FIG. 2, sensor 50 includes a probe or main body portion 70 having a first end portion 72, a second end portion 73 and an intermediate portion 74 that collectively define an interior cavity 76. Probe 70 is provided with a plurality of threads 78 that facilitate mounting to turbine 2. In addition, intermediate portion 74 is provided with a hex nut portion 79 that enables a technician to readily install and tighten probe 70 relative to turbine 2. Hex nut portion 79 could be fixed relative to probe 70 or be free to rotate and serve as a jam nut. In any case, sensor 50 includes a first sensing member 90 for detecting a parameter of turbine 2. In the embodiment shown, first sensing member 90 is a vibration sensor including a vibration detection portion 92 coupled to a circuit board 93 through a connecting lead 94. Sensing member 90 can be a proximity sensor, an accelerometer, a seismic sensor or the like. As shown, circuit board 93 includes a signal lead 96 that provides a communication link between sensor 50 and data acquisition device 60.

In accordance with one aspect of the invention, sensor 50 also includes a second sensing member 110 for sensing an orientation of probe 76 relative to, in the exemplary embodiment, turbine 2. As shown, sensing member 110 is mounted to circuit board 93, however, depending upon the particular type of sensor employed, sensing member 110 could be mounted adjacent sensing member 90 or even externally to probe 76. In any event, in order to accurately interpret data collected from sensing member 90, data analysis portion 63 must be configured with the particular orientation of probe 76. Towards that end, sensing member 110 detects the particular orientation of probe 76 relative to turbine 2 by sensing a gravitational pull or force. Once detected, the particular orientation of probe 76 is passed into configuration portion 63 which then determines any correction factors that may be necessary for analyzing data from sensing member 90. More specifically, the correction factors are used to reconfigure configuration portion 63 to report accurate orientation data for sensor 50. The orientation data can be passed from sensing member 110 into data acquisition device 60 using a variety of known communication protocols such as, for example, a smart protocols in the form of a HART communication protocol, a Profibus communication protocol and Foundation Fieldbus communication protocol.

With this arrangement, the orientation of a new sensor(s) is detected and automatically passed into data acquisition device 60. In addition, the present invention enables data acquisition device to monitor the orientation of existing sensors. If a change in orientation, resulting from improper placement of a sensor following a routine maintenance cycle or replacement of a faulty sensor, is detected, configuration portion 63 automatically updates data analysis portion 62. In this manner, the present invention ensures that data collection remains both seamless and accurate.

Figure 3:
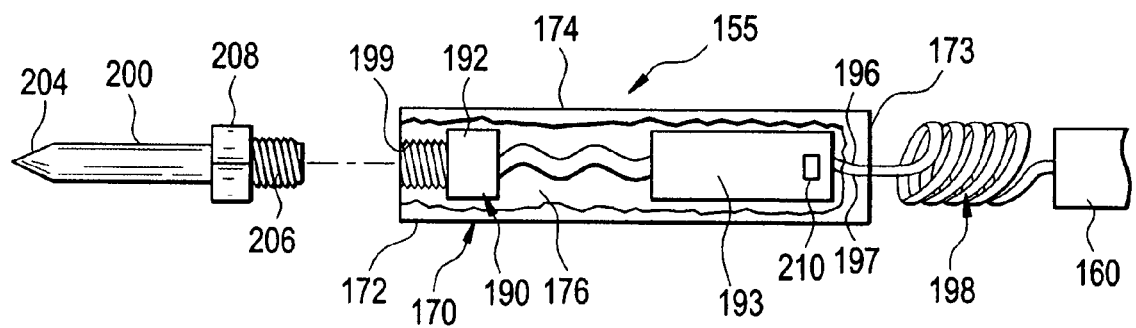
FIG. 3 is a side view of a portable orientation aware sensor constructed in accordance with another aspect of the present invention.

Reference will now be made to FIG. 3 in describing a portable sensing device 150 constructed in accordance with another aspect of the present invention. As shown, portable sensing device 150 includes a sensor portion 155 coupled to a data acquisition portion 160. Sensor portion 155 includes a main body portion 170 having a first end portion 172, a second end portion 173 and an intermediate portion 174 that collectively define a housing 176. Sensor portion 155 includes a first sensing member 190 having a detection portion 192 connected to a circuit board 193. Circuit board 193 includes a signal lead 196 that extends through a flexible outer sheath or casing 198 to data acquisition portion 160. Sensor portion 155 further includes a probe receiving portion 199 that is configured to receive a probe 200. In the embodiment shown, probe 200 is constituted by a single probe having a tip/contact portion 204 extending to a connecting portion 206. Connecting portion 206 is threaded to facilitate connection with probe receiving portion 199. Once attached, probe 200 is brought into contact with an object so that sensing member 190 can sense a parameter of the object and pass data to detection portion 192. The data is then passed to circuit board 193 and onto data acquisition portion 160 for analysis and review.

In accordance with the present aspect of the invention, portable sensing device 150 also includes a second sensing member 210. Second sensing member 210 is configured to detect the orientation of probe 200 relative to an object being sensed. With portable sensor 150 in hand, technicians can periodically, or randomly check various portions of, for example, a gas turbine engine or other object to be tested that are not provided with a dedicated sensor. In any event, regardless of the object being tested, orientation sensor 210 automatically detects the particular position of probe 200 and updates data acquisition portion 160. In this manner, data acquisition portion 160 can automatically determine any necessary correction factor for analyzing data acquired through probe 200 and provide accurate information to the technician.

At this point it should be appreciated that the present invention minimizes any data analysis errors that may occur as a result of improper sensor position information. In addition, the present invention provides for a portable sensing device that is employed to sense areas of a device not provided with a dedicated sensor. The portable sensing device automatically determines a position of a sensor probe relative to the object being sensed and calculates any necessary correction factors in order to provide accurate data to personal taking measurements of the object. Although described with reference to illustrated aspects of the present invention, it should be readily understood that various changes and/or modifications can be made to the invention without departing from the scope thereof. For instance, while the orientation sensor is described as being in a vibration probe, various other probes which require position related data can be employed. In addition, while shown as separate components in the probe, the first and second sensing member could be integrated into a single sensor. Also, while the portable sensing device is shown as having a probe with a single sensing tip, the portable sensing device can be provided with a probe having multiple sensing tips without departing from the scope of the invention. In general, the invention is only intended to be limited by the scope of the following claims.

The invention claimed is:
1. A sensor for detecting a parameter of an object comprising:
    a probe mounted to the object being sensed;
    a first sensing member, provided in the probe, that detects a parameter of an object to be sensed while the object to be sensed is in operation; and
    a second sensing member that senses an angular orientation of the probe relative to the object to be sensed by sensing a gravitational force on the first sensing member.

2. The sensor according to claim 1, wherein the second sensing member is provided in the probe.

3. The sensor according to claim 1, further comprising: a data acquisition device including a data analysis portion and a configuration portion, said data analysis portion receiving data related to the parameter detected by the first sensing member and said configuration portion receiving data related to the orientation of the probe relative to the object to be sensed collected by the second sensing member.

4. The sensor according to claim 3, wherein the data acquisition device employs a smart protocol to communicate with at least one of the first and second sensing members.

5. The sensor according to claim 4, wherein the smart protocol is at least one of a HART protocol, a Profibus protocol and a Foundation Fieldbus protocol.

6. The sensor according to claim 1, wherein the first sensing member is a vibration sensor.

7. The sensor according to claim 6, wherein the vibration sensor is a seismic sensor.

8. The sensor according to claim 6, wherein the vibration sensor is a proximity sensor.

9. The sensor according to claim 6, wherein the probe is mounted relative to a bearing assembly such that the first sensing member detects vibration associated with the bearing assembly.

10. The sensor according to claim 9, wherein the bearing assembly is provided in a turbine engine.

11. The sensor according to claim 1, wherein the sensor is a portable sensing device.

12. A method of sensing orientation of a sensor that monitors a parameter of an object comprising:
   mounting a probe relative to an object to be sensed
   sensing through at least one sensing member provided in the probe a parameter of the object while the object is in operation; and
   sensing an angular orientation of the probe relative to the object being sensed with another sensing member that senses a gravitational force on the first sensing member.

13. The method of claim 12, further comprising: communicating the orientation of the probe to a data acquisition device.

14. The method of claim 13, further comprising: communicating the orientation of the probe to the data acquisition device through at least one of a HART protocol, a Profibus protocol and a Foundation Fieldbus protocol.

15. The method of claim 12, wherein mounting the probe relative to the object to be sensed includes mounting the probe to a turbine engine.

16. The method of claim 12, wherein mounting the probe relative to an object to be sensed includes contacting the object to be sensed with a portable probe.

17. The method of claim 12, wherein sensing the parameter of the object to be sensed includes sensing vibrations of the object to be sensed.

18. A turbomachine comprising:
   at rotating member; and
   a sensor including a probe mounted to the turbomachine relative to the rotating member, a first sensing member provided in the probe that detects a parameter of the rotating member during operation of the turbomachine and a second sensing member that senses an angular orientation of the probe relative to the turbomachine by sensing a gravitational force on the first sensing member.

19. The turbomachine according to claim 18, wherein the sensor includes a data acquisition device including a data analysis portion and a configuration portion, said data analysis portion receiving data related to the parameter detected by the first sensing member and said configuration portion receiving data related to the orientation of the probe relative to the turbomachine collected by the second sensing member.

20. The turbomachine according to claim 19, wherein the data acquisition device employs a smart protocol to communicate with at least one of the first and second sensing members, said smart protocol being at least one of a HART protocol, a Profibus protocol and a Foundation Fieldbus protocol.

* * * * *